(12) United States Patent
Lunttila et al.

(10) Patent No.: US 10,313,073 B2
(45) Date of Patent: *Jun. 4, 2019

(54) TRANSMISSION OF REFERENCE SIGNALS (71) Applicant: Nokia Solutions and Networks Oy, Espoo (FI)

(72) Inventors: Timo Erkki Lunttila, Espoo (FI); Esa Tapani Tiirola, Kempele (FI); Kari Pekka Pajukoski, Oulu (FI); Kari Juhani Hooli, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/005,370

(22) Filed: Jan. 25, 2016

(65) Prior Publication Data

US 2016/0142190 A1 May 19, 2016

Related U.S. Application Data (63) Continuation of application No. 13/817,209, filed as application No. PCT/EP2010/061876 on Aug. 16, 2010.

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0626* (2013.01); *H04L 5/001* (2013.01);
(Continued)

(58) Field of Classification Search
CPC ...................................................... H04L 45/02
See application file for complete search history.

(56) References Cited

U.S. PATENT DOCUMENTS

| | | | |
|---|---|---|---|
| 8,437,270 B2 | 5/2013 | Zhu et al. | 370/252 |
| 2008/0232234 A1 | 9/2008 | McCoy et al. | 370/203 |

(Continued)

FOREIGN PATENT DOCUMENTS

| | | |
|---|---|---|
| CN | 101645868 A | 2/2010 |
| JP | 2013/535941 A | 9/2013 |

(Continued)

OTHER PUBLICATIONS

R1-100860, TSG-RAN WG1 #60, San Francisco, USA, Feb. 22-26, 2010, "Further Discussions on SRS Enhancements", Ericsson, ST-Ericsson, 3 pgs.

(Continued)

*Primary Examiner* — Edan Orgad
*Assistant Examiner* — Emmanuel K Maglo
(74) *Attorney, Agent, or Firm* — Harrington & Smith (57) ABSTRACT

Resources for reference signalling on at least one component carrier of a plurality of aggregated component carriers can be determined by a station. Information indicative the at least one component carrier and the associated resources is then communicated to another station for configuration of the other station. A trigger is then sent for reference signalling, and in response to the trigger, at least one reference signal is sent from the other station using the indicated at least one component carrier and resources.

34 Claims, 4 Drawing Sheets

(51) Int. Cl.
*H04L 27/26* (2006.01)
*H04W 72/04* (2009.01)
*H04W 24/10* (2009.01)

(52) U.S. Cl.
CPC .......... *H04L 5/0023* (2013.01); *H04L 5/0051* (2013.01); *H04L 5/0053* (2013.01); *H04L 5/0057* (2013.01); *H04L 5/0085* (2013.01); *H04L 5/0094* (2013.01); *H04L 27/261* (2013.01); *H04W 72/0406* (2013.01); *H04W 72/0446* (2013.01); *H04W 72/0453* (2013.01); *H04W 24/10* (2013.01)

(56) References Cited

U.S. PATENT DOCUMENTS

| | | | |
|---|---|---|---|
| 2009/0042615 A1* | 2/2009 | Teo | H04B 7/0691 455/562.1 |
| 2009/0268831 A1 | 10/2009 | Dabak et al. | 375/260 |
| 2010/0040005 A1 | 2/2010 | Kim et al. | 370/329 |
| 2010/0080187 A1* | 4/2010 | Papasakellariou | H04L 5/0051 370/329 |
| 2010/0098012 A1* | 4/2010 | Bala | H04L 5/001 370/329 |
| 2010/0103902 A1* | 4/2010 | Kim | H04L 5/0048 370/330 |
| 2010/0232385 A1* | 9/2010 | Hsu | H04W 74/02 370/329 |
| 2010/0246561 A1* | 9/2010 | Shin | H04W 52/32 370/345 |
| 2011/0058505 A1* | 3/2011 | Pan | H04J 11/005 370/280 |
| 2011/0081913 A1* | 4/2011 | Lee | H04L 5/003 455/450 |
| 2011/0092240 A1* | 4/2011 | Aiba | H04L 1/0025 455/509 |
| 2011/0171964 A1* | 7/2011 | Lin | H04L 5/0023 455/450 |
| 2011/0199944 A1 | 8/2011 | Chen et al. | 370/280 |
| 2011/0243262 A1* | 10/2011 | Ratasuk | H04L 5/003 375/260 |
| 2011/0268028 A1* | 11/2011 | Stern-Berkowitz | H04L 5/0048 370/328 |
| 2011/0310818 A1* | 12/2011 | Lin | H04W 72/042 370/329 |
| 2011/0310821 A1* | 12/2011 | Kim | H04B 7/15542 370/329 |
| 2012/0002568 A1* | 1/2012 | Tiirola | H04L 1/0026 370/252 |
| 2012/0039273 A1* | 2/2012 | Nam | H04L 5/0005 370/329 |
| 2012/0044906 A1* | 2/2012 | Chen | H04L 5/001 370/329 |
| 2012/0076115 A1* | 3/2012 | Noh | H04B 7/2656 370/336 |
| 2012/0082124 A1* | 4/2012 | Kwon | H04L 5/0007 370/329 |
| 2012/0087427 A1* | 4/2012 | Noh | H04B 7/0613 375/260 |
| 2012/0093119 A1 | 4/2012 | Kim | |
| 2012/0099553 A1* | 4/2012 | Aiba | H04L 5/001 370/329 |
| 2012/0213089 A1* | 8/2012 | Shi | H04L 5/001 370/241 |
| 2012/0224557 A1 | 9/2012 | Noh et al. | 370/329 |
| 2012/0281527 A1* | 11/2012 | Sebire | H04W 76/028 370/228 |
| 2012/0281582 A1* | 11/2012 | Yang | H04L 5/0007 370/252 |
| 2012/0281654 A1* | 11/2012 | Aiba | H04L 5/0007 370/329 |
| 2012/0327876 A1* | 12/2012 | Ouchi | H04B 1/713 370/329 |
| 2013/0028134 A1* | 1/2013 | Wang | H04L 5/0048 370/254 |
| 2013/0201929 A1* | 8/2013 | Dai | H04L 5/001 370/329 |

FOREIGN PATENT DOCUMENTS

| | | |
|---|---|---|
| WO | WO-2010/013963 A2 | 2/2010 |
| WO | WO-2010/036053 A2 | 4/2010 |
| WO | WO-2010/048142 A1 | 4/2010 |
| WO | 2010178129 A | 8/2010 |
| WO | WO-2012/022368 A1 | 2/2012 |

OTHER PUBLICATIONS

R1-102114, 3GPP TSG-RAN #60bis, Beijing, China, Apr. 12-16, 2010, "Aperiodic SRS for LTE-A", Motorola, 2 pgs.

R1-102966, 3GPP TSG RAN WG1 Meeting #61, Montreal, Canada, May 10-14, 2010, "Dynamic Aperiodic SRS", Nokia Siemens Networks, Nokia, 2 pgs.

R1-102797, Alcatel-Lucent, Alcatel-Lucent Shanghai Bell; "Triggering of Dynamic Aperiodic SRS", 3GPP TSG-RAN WG1 #61, Montreal, Canada, May 10-14, 2010.

* cited by examiner

TRANSMISSION OF REFERENCE SIGNALS

CROSS-REFERENCE TO RELATED APPLICATIONS

This application is a continuation of U.S. Patent Application SN 13/817,209, which is the National Stage of International Application No. PCT/EP2010/061876, filed Aug. 16, 2010.

The invention relates to transmission of reference signals in a communication system. More particularly, but not exclusively, the invention relates to transmission of sounding reference signals in systems employing carrier aggregation.

A communication system can be seen as a facility that enables communication sessions between two or more entities such as mobile communication devices, base stations and/or other communication nodes. A communication system and compatible communicating entities typically operate in accordance with a given standard or specification which sets out what the various entities associated with the system are permitted to do and how that should be achieved. For example, the standards, specifications and protocols can define the manner how and based on which access technology communication devices can access the communication system and how communication shall be implemented between communicating devices, the elements of a communication network and/or other communication devices. In a wireless communication system at least a part of the communication between at least two stations occurs over a wireless link. Examples of wireless systems include public land mobile networks (PLMN) such as cellular networks, satellite based communication systems and different wireless local networks, for example wireless local area networks (WLAN). A wireless system can be divided into cells, and therefore are often referred to as cellular systems.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station of an access network and/or another user equipment. The communication device may access a carrier provided by a station, for example a base station, and transmit and/or receive communications on the carrier.

A carrier may comprise a composite carrier, i.e. a carrier that is provided by a plurality of sub or component carriers. Composite carriers may be provided by utilising what is known as carrier aggregation. In carrier aggregation a plurality of carriers are aggregated to increase bandwidth. Such carriers are known as aggregated carriers, each aggregated carrier comprising a plurality of component carriers. Carrier aggregation is believed to be a technology that can be used to meet the bandwidth and peak data rate requirements set for new systems and higher demand for data services.

An example of communications systems attempting to satisfy the increased demands for capacity is an architecture that is being standardized by the 3$^{rd}$ Generation Partnership Project (3GPP) and is known as the long-term evolution (LTE) of the Universal Mobile Telecommunications System (UMTS) radio-access technology. The LTE technology aims to achieve various improvements, for example reduced latency, higher user data rates, improved system capacity and coverage, reduced cost for the operator and so on. A further development of the LTE is often referred to as LTE-Advanced. The various development stages of the 3GPP LTE specifications are referred to as releases.

Various reference signals may be provided for enabling the operation of a communication system. For example, 3GPP has specified use of uplink demodulation reference signals (UL DM RS). LTE release 8 defines sounding reference signals (SRS). A use of the sounding reference signals is for uplink (UL) link adaptation. Sounding reference signals can be used to provide information on uplink channel quality on a wider bandwidth than the current physical uplink shared channel (PUSCH) transmission or when the user equipment has no transmissions on the PUSCH. Channel estimation is typically provided by a base station, called eNB in the 3GPP, where after the obtained channel information can be utilized in the optimization of uplink scheduling. Sounding reference signals can be used also for other purposes, e.g. to facilitate uplink timing estimation for user equipments with narrow or infrequent uplink transmissions. In time division duplexing (TDD) operation SRS can also be used to provide an estimate of the downlink (DL) channel state due to the channel reciprocity between DL and uplink (UL). Sounding reference signal can be transmitted on the last single-carrier frequency division multiple access (SC-FDMA) symbol of the sub-frame.

A feature added into the LTE specifications in release 10 is that the communication system shall support for uplink (UL) multiple antenna transmission. A sounding reference signal (SRS) can be used to enable this to allow link adaptation and frequency domain packet scheduling in the uplink as well as precoder selection. Furthermore, due to channel reciprocity in time division duplexing (TDD) sounding reference signal (SRS) can be utilized for downlink (DL) link adaptation and precoding as well in multi-antenna systems.

Introduction of uplink multiple input multiple output (UL MIMO) techniques can have an impact on various aspects, for example on transmission of the sounding reference signal. It has been agreed in the 3GPP standardization that uplink demodulation reference signals (UL DM RS) are precoded the same way as data. Hence these references cannot typically be utilized for obtaining channel state information for link adaptation and precoder selection. Furthermore, the UL MIMO creates a need to sound multiple antennas, hence potentially consuming more sounding reference signal resources. With single-user multiple input multiple output (SU-MIMO) as many cyclic shifts are required as is the rank of the transmission (up to four). Thus the availability of the sounding reference signal resources can become a bottleneck in a design such as those based on LTE release 10.

Transmission of a so-called dynamic aperiodic sounding reference signal has been proposed to enable efficient usage of sounding reference signals with optimized overhead with e.g. UL MIMO. However, no solution exists how to operate aperiodic reference signalling together with carrier aggregation. For example, no mechanisms exist how to indicate on which UL CC to send sounding reference signalling. Also, it can become problematic how to signal aperiodic SRS transmission without simultaneous PUSCH grant for data. Realization of Cross-CC Aperiodic SRS signalling when Cross-CC scheduling has not been configured can also become an issue.

It is noted that the above discusses only examples, and the issues are not limited to any particular communication system, standard, specification and so forth, but may occur in any appropriate communication system where aperiodic reference signalling might be desired.

Embodiments of the invention aim to address one or several of the above issues.

In accordance with an embodiment there is provided a method for reference signalling, comprising determining resources for reference signalling on at least one component carrier of a plurality of aggregated component carriers, sending information indicative the at least one component carrier and the associated resources for configuration of a station for reference signalling, sending a trigger for reference signalling, and in response to the trigger, receiving at least one reference signal from the station on the indicated at least one component carrier.

In accordance with another embodiment there is provided a method for reference signalling, comprising receiving at a station information indicative of at least one component carrier of aggregated component carriers and associated resources for use in reference signalling, and in response to a trigger, sending from the station at least one reference signal using the indicated at least one component carrier and resources.

In accordance with another embodiment there is provided a control apparatus for a first station, the control apparatus comprising at least one processor, and at least one memory including computer program code, wherein the at least one memory and the computer program code are configured, with the at least one processor, to determine resources for reference signalling on at least one component carrier of a plurality of aggregated component carriers, and to cause sending of information to a second station indicative the at least one component carrier of a plurality of aggregated component carriers and the associated resources to be used for reference signalling by the second station.

In accordance with yet another embodiment there is provided a control apparatus, the control apparatus comprising at least one processor, and at least one memory including computer program code, wherein the at least one memory and the computer program code are configured, with the at least one processor, to determine, from signalling received from a first station, information indicative of at least one component carrier of aggregated component carriers and associated resources for use in reference signalling by a second station, and in response to a trigger, to cause sending from the second station at least one reference signal using the indicated at least one component carrier and resources.

In accordance with a more detailed embodiment the reference signal comprises an aperiodic sounding reference signal.

Information of resources associated with a component carrier may comprise an indication of at least one time instance on which reference signalling can be sent on the component carrier.

The associated resources may comprise transmission parameters for the at least one component carrier. The transmission parameters may define a set of cell specific and/or user equipment specific reference signal subframes, and/or reference signal starting position, and/or reference signal bandwidth, and/or reference signal comb, and/or reference signal hopping configuration, and/or reference signal sequence.

The station may be provided with a time pattern that is indicative of possible subframes for sending of reference signalling.

A reference signal may be sent or received in the first available subframe following a subframe carrying a trigger for reference signalling.

The station sending the reference signalling may analyse the information from the other station and the trigger to determine at least one component carrier, timing and other resources for the triggered reference signalling.

Said information and the trigger can be communicated in separate messages. According to a possibility an indication of the at least one component carrier and the trigger are communicated in a single message. The indication of the at least one component carrier to be used can be carried by a resource assignment message. The resource assignment message may comprise an uplink grant or a downlink grant signalled on a physical control channel.

At least one component carrier for use in reference signalling may be determined based on analysis of predefined bits of the message.

In accordance with an embodiment it is determined that the message is only for assigning resources for signalling of aperiodic channel state information, where after the state of the trigger for reference signalling is checked. It can be further determined, based on the message, whether only reference signalling is to be transmitted. At least one component carrier for reference signalling can be determined based on analysis of a predefined part of the message.

Components carriers may be prioritized relative to each other.

The at least one component carrier may be determined based on a linked component carrier.

In accordance with further embodiments apparatus and/or computer program product that can be embodied on a computer readable medium for providing at least one of the above methods is provided.

A communication device and/or base station comprising a control apparatus configured to provide at least one of the embodiments can also be provided. The communication device may comprise a user equipment.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are also described in the following detailed description of examples embodying the invention and in the attached claims.

The invention will now be described in further detail, by way of example only, with reference to the following examples and accompanying drawings, in which.

In the following certain exemplifying embodiments are explained with reference to a wireless or mobile communication system serving mobile communication devices. Before explaining in detail the exemplifying embodiments, certain general principles of a wireless communication system, control apparatus thereof and mobile communication devices are briefly explained with reference to FIGS. 1 to 3 to assist in understanding the technology underlying the described examples.

Figure 1:
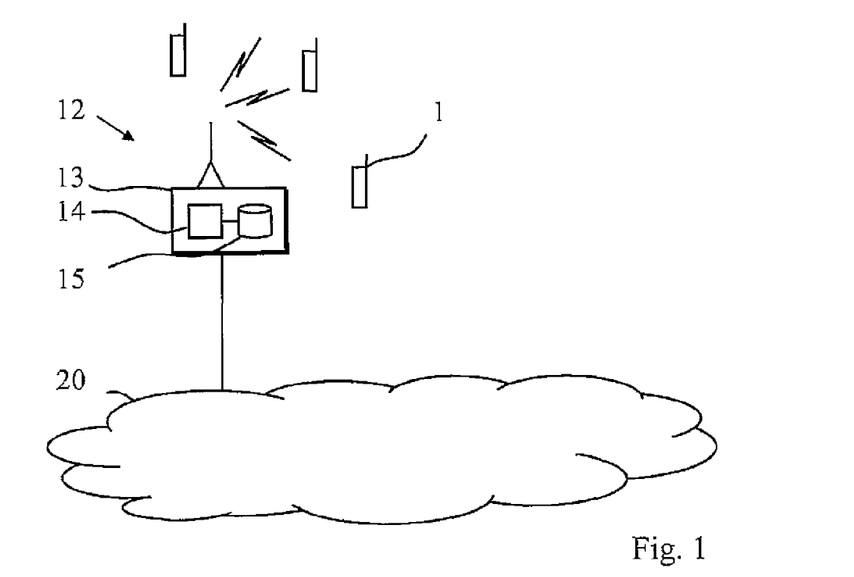
FIG. 1 shows an example of a communication system wherein below described examples of the invention may be implemented.

A communication device may provide, for example, communication of data for carrying communications such as voice, electronic mail (email), text message, multimedia and so on. A mobile communication device 1 can be used for accessing various services and/or applications provided via a communication system. Mobile users may thus be offered and provided numerous services via their mobile communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information.

A mobile communication device 1 is typically provided wireless access via at least one base station 12 or similar wireless transmitter and/or receiver node of an access system. It is noted that although only one access systems is shown, any number of access systems may be provided in a communication system. An access system may be provided by a cell of a cellular system or another system enabling a communication device to access a communication system. A base station site 12 can provide one or more cells of the plurality of cells of a cellular communication system. A base station can be configured to provide a cell, but a base station can also provide, for example, three sectors, each sector providing a cell. Each mobile communication device 1 and base station 12 may have one or more radio channels open at the same time and may send signals to and/or receive signals from more than one source.

A base station 12 is typically controlled by at least one appropriate controller so as to enable operation thereof and management of mobile communication devices 1 in communication with the base station. The control apparatus can be interconnected with other control entities. In FIG. 1 a controller apparatus is shown to be provided by block 13. A base station control apparatus is typically provided with memory capacity 15 and at least one data processor 14. It shall be understood that the control apparatus and functions thereof may be distributed between a plurality of control units.

The communication devices 1 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

A non-limiting example of the recent developments in communication systems is the long-term evolution (LTE) of the Universal Mobile Telecommunications System (UMTS) that is being standardized by the $3^{rd}$ Generation Partnership Project (3GPP). As explained above, further development of the LTE is referred to as LTE-Advanced. Non-limiting examples of appropriate access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio access system include those provided by base stations of systems that are based on technologies such as wireless local area network (WLAN) and/or WiMax (Worldwide Interoperability for Microwave Access).

In FIG. 1 example the base stations of the access systems are connected to a wider communications network 20. A controller may be provided in the network 20 for coordinating the operation of the access systems. Although not shown, a gateway function may also be provided to connect to another network via the network 20. The other network may be any appropriate network, for example another communication network, a packet data network and so on. A wider communication system may thus be provided by one or more interconnect networks and the elements thereof, and one or more gateways may be provided for interconnecting various networks.

Figure 2:
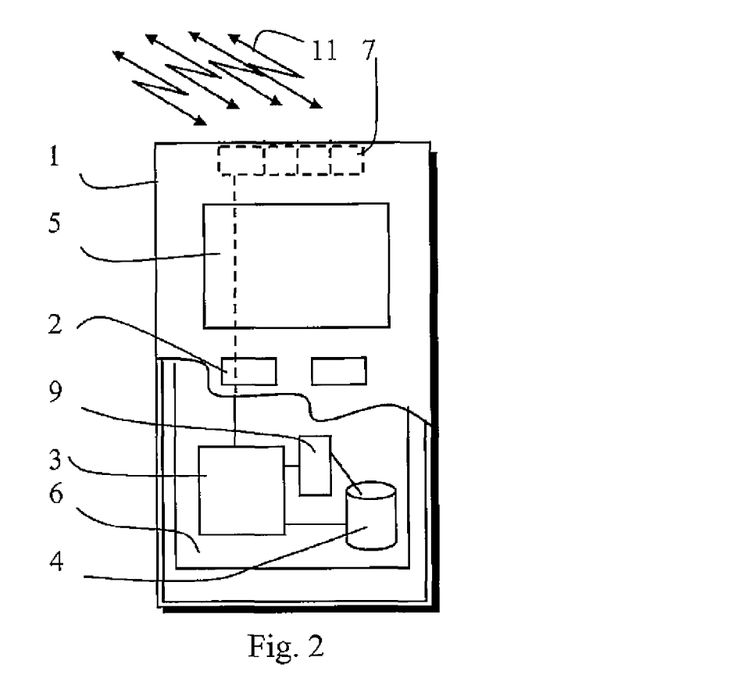
FIG. 2 shows an example of a communication device.

FIG. 2 shows a schematic, partially sectioned view of a communication device 1 that a user can use for communication. Such a communication device is often referred to as user equipment (UE). An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may be used for voice and video calls, for accessing service applications and so on. The mobile device 1 may receive signals over an air interface 11 via appropriate apparatus for receiving and may transmit signals via appropriate apparatus for transmitting radio signals. In FIG. 2 transceiver apparatus is designated schematically by blocks 7. The transceiver may be provided for example by means of a radio part and associated antenna arrangement. The antenna arrangement may be arranged internally or externally to the mobile device.

A wireless communication device can be provided with a Multiple Input/Multiple Output (MIMO) antenna system, this being denoted by the four antenna blocks 7 and the plurality of signals 11. MIMO arrangements as such are known. MIMO systems use multiple antennas at the transmitter and receiver along with advanced digital signal processing to improve link quality and capacity. The multiple antennas can be provided, for example at base stations and mobile stations. More data can be received and/or sent where there are more antennae elements. A station may comprise an array of multiple antennae.

A user equipment may also be provided with single antenna only, or then configured to use a single antenna port. It is noted that the difference between definitions "single antenna" and "single antenna port" is that a device with a single antenna can send signals only from a single antenna whereas "single antenna port" means that the transmitted signal resembles single antenna transmission but may be transmitted from multiple antennas in a transparent manner.

A mobile device is also typically provided with at least one data processing entity 3, at least one memory 4 and other possible components 9 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 6. Possible control functions in view of configuring the mobile communication device for transmission of reference signals by means of the data processing facility in accordance with certain embodiments of the present invention will be described later in this description.

The user may control the operation of the mobile device by means of a suitable user interface such as key pad 2, voice commands, touch sensitive screen or pad, combinations thereof or the like. A display 5, a speaker and a microphone are also typically provided. Furthermore, a mobile communication device may comprise appropriate connectors (either wired or wireless) to other devices and/or for connecting external accessories, for example hands-free equipment, thereto.

Figure 3:
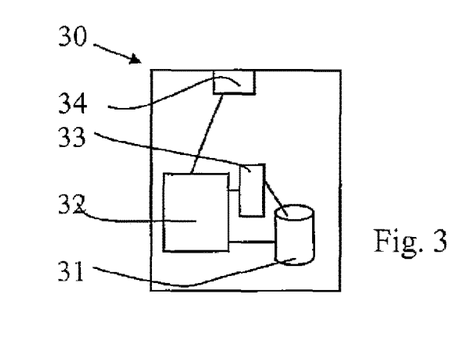
FIG. 3 shows an example of controller apparatus for a base station.

FIG. 3 shows an example of a control apparatus 30 for a communication system, for example to be coupled to and/or for controlling a station of an access system. The control apparatus 30 can be arranged to provide control on communications by mobile communication devices that are in the area of the system. The control apparatus 30 can be configured to facilitate dynamic sending of reference signals by a base station as will be described in more detail below. For this purpose the control apparatus comprises at least one memory 31, at least one data processing unit 32, 33 and an input/output interface 34. Via the interface the control apparatus can be coupled to a receiver and a transmitter of the base station. The control apparatus 30 can be configured to execute an appropriate software code to provide the control functions as explained below.

The required data processing apparatus and functions of a base station apparatus, a communication device and any other appropriate station may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor-based memory devices, magnetic memory devices and systems, optical memory devices and systems, fixed memory and removable memory.

Certain exemplifying embodiments of the invention are now described with reference to 3GPP LTE. Some particular embodiment are described with reference to LTE releases 8 and 10 in the context of LTE release 10 compatible Multiple Input/Multiple Output (MIMO) system and uplink (UL) carrier aggregation.

Figure 4:
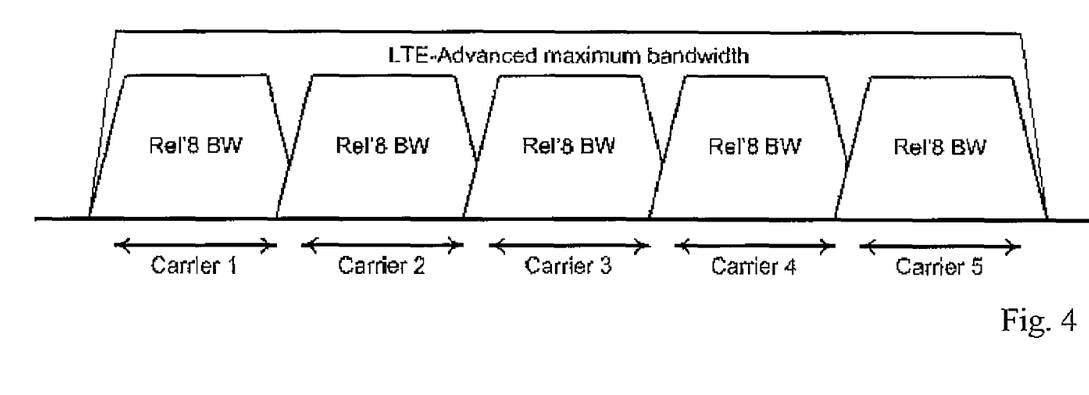
FIG. 4 shows an example of carrier aggregation.

LTE-Advanced (LTE Release 10) provides for bandwidth extensions beyond 20 MHz of the LTE release 8, relays, cooperative MIMO and MIMO enhancements such as advanced multi-user MIMO (MU-MIMO) and introduction of SU-MIMO in the uplink. The bandwidth extension beyond 20 MHz in LTE-Advanced is to be provided via component carrier aggregation (CA), in which several Release 8 compatible carriers are aggregated together to form a larger bandwidth. This is illustrated in FIG. 4. In carrier aggregation two or more carriers, referred to as component carriers are aggregated such that a communication device may simultaneously receive one or multiple component carriers depending on its capabilities. For example, an LTE-Advanced mobile communication device with reception capability beyond 20 MHz can simultaneously receive on multiple component carriers. In the example of FIG. 4 a plurality of Release 8 bandwidth "chunks", or component carriers, are combined together to form M×Rel8 bandwidth (BW). For example, given M=5, one would have 5×20 MHz=100 MHz. LTE-Advanced communication may receive/transmit on multiple component carriers simultaneously, and thus reach higher bandwidths.

In LTE Release 8 the PDCCH can only be used to indicate physical downlink shared channel/physical uplink shared channel (PDSCH/PUSCH) sent on its own DL CC or its paired UL CC. In LTE-Advanced, so-called "cross-CC scheduling" is supported via carrier indicator field (CIF), which means the PDCCH can be used to indicate PDSCH/PUSCH resources sent on other CCs indicated by CIF. Crass-component carrier scheduling without CIF bits according to a pre-determined downlink component carrier-uplink component carrier linkage is also supported by LTE-Advanced.

Figure 5:
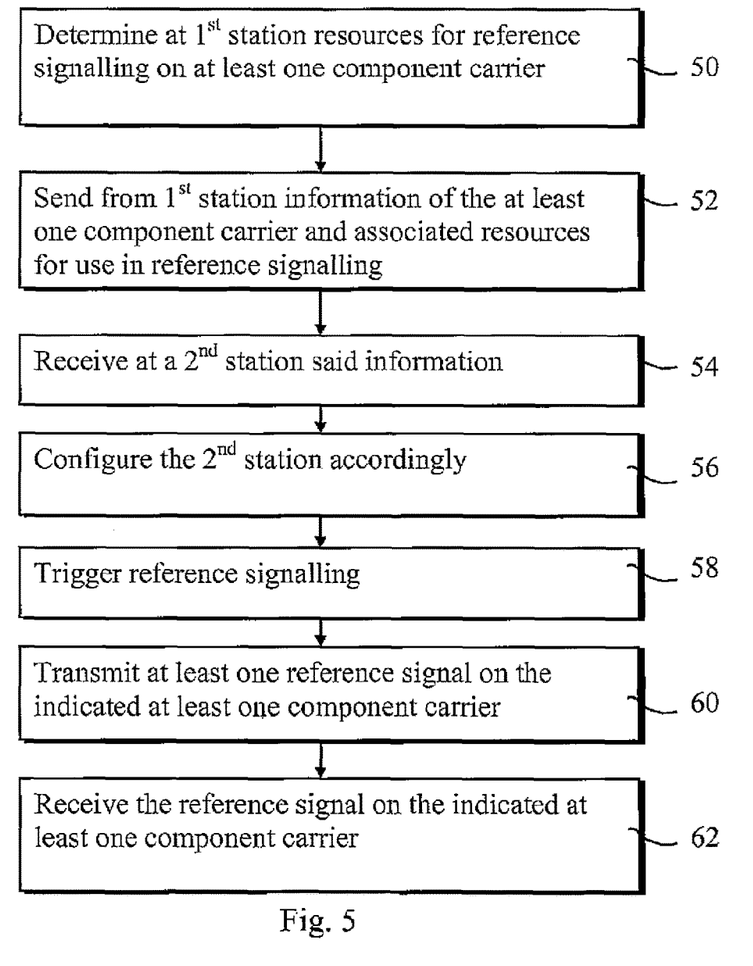
FIG. 5 is flowchart illustrating an embodiment.

FIG. 5 shows a flowchart in accordance with an embodiment, illustrating a method for reference signalling. In this embodiment a first station, for example a base station, determines resources for reference signalling on at least one component carrier of a plurality of aggregated component carriers at 50. The first station can then send at 52 information indicative of at least one component carrier of a plurality of aggregated component carriers that is to be used for reference signalling by a second station. At this stage information indicative the associated resources can also be transmitted. For example, information of configuration parameters and/or a transmission time pattern for each component carrier can be signalled to the second station. The second station receives at 54 said information and can then configure itself accordingly at 56. For example, the second station can analyse the information to identify the relevant component carrier or carriers and to find out the time instances when reference signal or signals can be transmitted.

It is noted that the first station may send the information at any time on an appropriate channel. The second station can monitor signalling from the first station to detect the information when within the coverage area of the first station.

The first station may then send a trigger for reference signalling to the second station at 58. In response to receiving the trigger, the second station can send at 60 at least one reference signal on the indicated at least one component carrier and resources. The first station then receives the at least one reference signal on the indicated at least one component carrier at 62.

In more detailed embodiments the reference signals comprise dynamic aperiodic sounding reference signals (SRS) that are used in systems employing carrier aggregation. To enable efficient usage of sounding reference signal (SRS) with optimized Physical Downlink Control Channel (PDCCH) overhead support for dynamic aperiodic SRS transmission can be provided. Dynamic aperiodic SRS can be triggered for example with an uplink (UL) grant. According to a possibility a downlink (DL) assignment or a group grant message, for example similar to Downlink Control Information (DCI) format 3X, may be used as a trigger. In order to make efficient use of the aggregated spectrum, aperiodic SRS can be tailored for the support of multiple component carriers (CC).

In the following, a more detailed description is given of the related downlink (DL) signalling aspects to enable SRS triggering for the desired uplink component carrier. More particularly, the following gives examples of downlink signalling mechanisms and rules that can be used for aperiodic channel state information (CSI) report triggering in a system with carrier aggregation. The channel state information report can include information such as Channel Quality Indicator (CQI), Precoding Matrix Indicator (PMI) and Rank Indicator (RI). In the examples, a way to indicate or derive on which uplink component carrier (UL CC) the dynamic aperiodic sounding reference signals are sent is provided.

In accordance with a possibility, a dynamic aperiodic SRS transmission is tied to the time (subframe) configuration of the user equipment (UE) and reference signalling resources, and, more particularly, component carrier specific aperiodic SRS resources. For example, a user equipment may have a component carrier specific aperiodic SRS configuration pattern(s) that indicate on which time instances (subframes) the aperiodic SRS can be sent.

Figure 6:
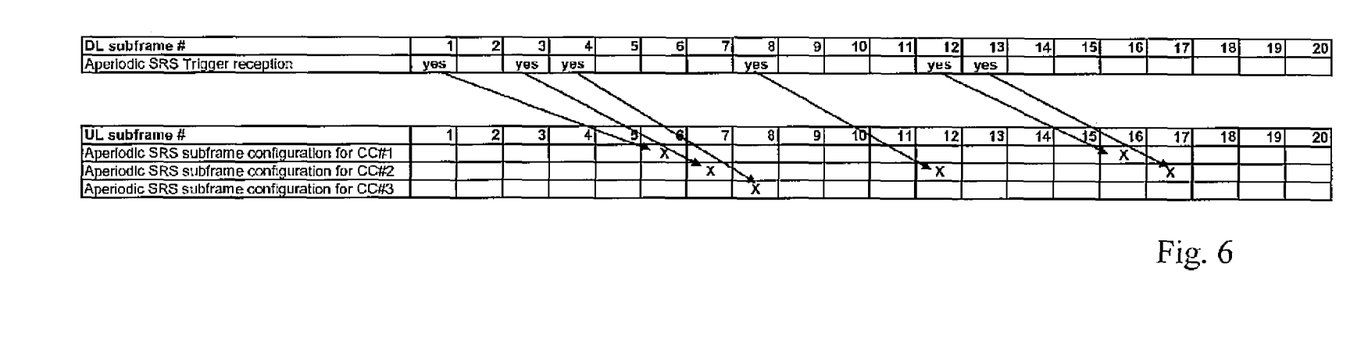
FIG. 6 is an example for a resource allocation pattern.

An example of such a time pattern in shown in FIG. 6. After receiving an appropriate trigger, the user equipment can then transmit SRS in the first possible subframe on the uplink component carrier (UL CC) or uplink component carriers as indicated by the configuration pattern.

An appropriate set of SRS parameters can be configured for each component carrier. Although not always necessary, at least some of the parameters may be common for some or all of the component carriers. In accordance with a possibility at least some of the following parameters are configured:

A set of cell specific and user equipment specific sounding reference signal (SRS) subframes. The periodicity and/or offset of the subframes may be defined.

Sounding reference signal starting position.

Sounding reference signal bandwidth. This may be user equipment and cell specific.

Sounding reference signal Comb.

Sounding reference signal hopping configuration.

Sounding reference signal sequence.

In view of the resources and parameters, it is noted that sounding reference signal transmissions can be flexibly configured. Sounding reference signal transmission may be a single transmission or periodic, the period typically ranging from 2 ms to 320 ms. There can be a plurality of different sounding reference signal bandwidth options available, depending on the system bandwidth and cell configuration. Sounding reference signal transmission can also hop in frequency. This is particularly beneficial for communication devices on a cell edge which cannot support wideband sounding reference signal transmissions. Frequency hopping can also be limited to a certain portion of system bandwidth. This can be beneficial for inter-cell interference coordination. Sounding reference signal configuration can be explicitly signaled via terminal specific higher layer signalling. The signalling can be common or dedicated. Sounding reference signal transmissions from different communication devices can be multiplexed in multiple dimensions, for example in time, so that periodic SRS transmissions are interleaved into different subframes with subframe offsets, in frequency, with cyclic shifts, and by means of a transmission comb in distributed transmission.

The configuration may be done with higher layer signalling. For example, the signalling can be provided by means of Radio Resource Control (RRC) or Medium Access Control (MAC) signalling.

The user equipment may then receive an aperiodic SRS trigger, for example on PDCCH that has been sent in the DL subframe #n. After the user equipment receives the aperiodic SRS trigger it can send the aperiodic SRS according to the configuration in the first possible subframe #n+m. For example, m can be 4. Selection of m=4 follows the downlink hybrid automatic repeat request (DL HARQ) timing cycle of the LTE.

An example of a possible time pattern configuration is shown in FIG. 6. The uplink component carrier (UL CC) on which an aperiodic sounding reference signal (SRS) is transmitted is derived from a component carrier (CC) specific configuration and the time instance when the user equipment receives a trigger for Aperiodic SRS Transmission. An SRS trigger received in the downlink subframe #n results in Aperiodic transmission in first uplink subframe #n+4 (if m=4) or later that is configured for aperiodic SRS transmission.

More particularly, an aperiodic SRS has been configured for 3 UL CCs (#1, #2, and #3). The user equipment specific aperiodic SRS subframe configuration for the three CCs is non-overlapping in this example. When the user equipment receives the aperiodic SRS subframe #n, it can send the aperiodic SRS according to the configuration or parameters indicated by the user equipment specific SRS configuration pattern configured for the uplink subframe #n+4.

If the uplink subframe #n+4 has not been configured to be an aperiodic SRS subframe, the SRS configuration can be derived from the first user equipment specific SRS subframe larger than #n+4. In the example of FIG. 6 this is the case with e.g. downlink subframe #2 since uplink subframe #5 is not an user equipment specific aperiodic SRS subframe. Hence the Aperiodic SRS is transmitted in the next user equipment specific aperiodic SRS uplink subframe, which is subframe #6, i.e. subframe #2+5.

It is also possible to configure the aperiodic SRS pattern so that user equipment specific SRS resources/configuration for multiple component carriers occur in the same subframe. In such a case a user equipment may interpret the configuration so that it transmits the aperiodic SRS for multiple component carriers simultaneously. Alternatively, the user equipment may prioritize some component carrier or carriers according to predefined criteria. Non-limiting examples for the basis of prioritization include periodicity, bandwidth and predefined priority order. For example, a component carrier with highest or lowest SRS periodicity can be prioritized over others, a component carrier with largest or smallest SRS bandwidth can be prioritized over others, or a component carrier with largest or smallest system bandwidth is prioritized. According to a possibility the priority order may be explicitly signaled to the user equipment.

Figure 7:
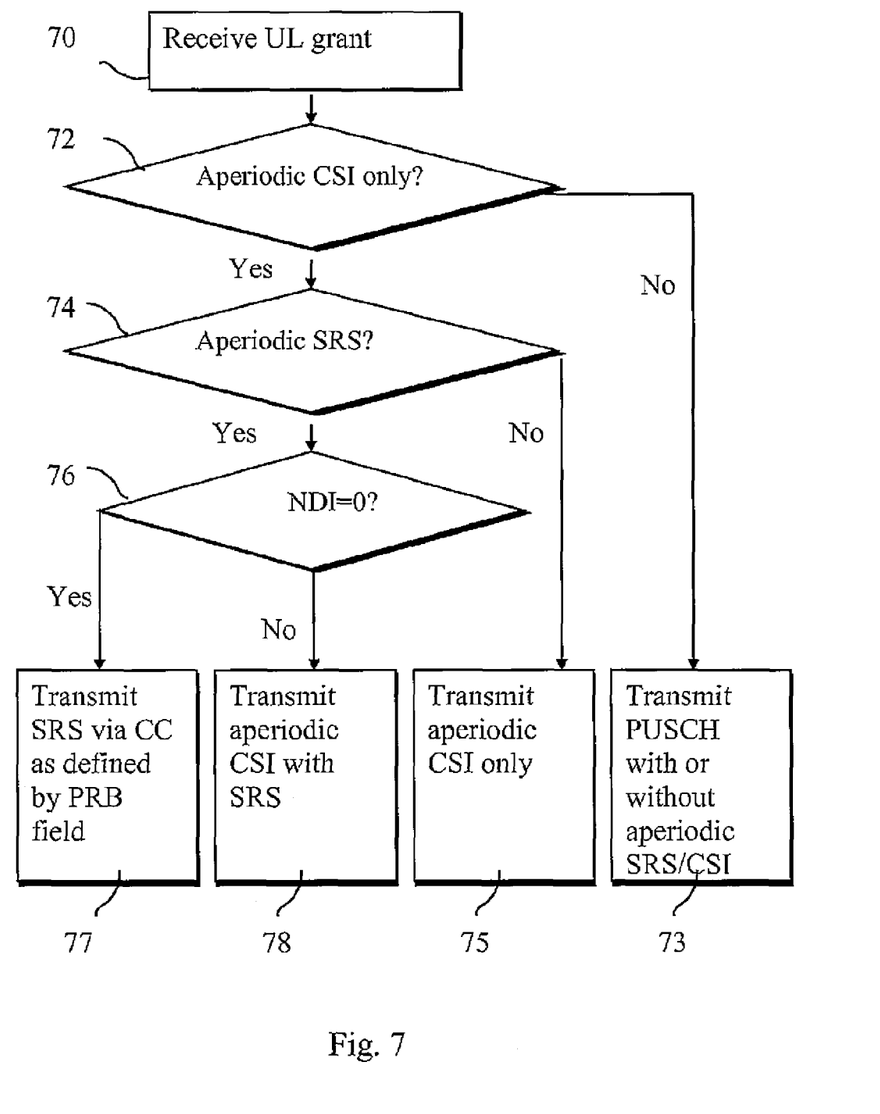
FIG. 7 is flowchart illustrating another embodiment.

The flowchart of FIG. 7 illustrates another possibility for configuring a station for reference signalling on at least one component carrier of an aggregated carrier. In this example, a dynamic aperiodic SRS is triggered with a UL downlink control information (DCI) format but without a simultaneous uplink grant for data and channel state information such as Channel Quality Indicator (CQI), Precoding Matrix Indicator (PMI) and Rank Indicator (RI). The embodiment utilizes unused or irrelevant signalling states to indicate the uplink component carrier for aperiodic SRS transmission. Instead of sending separate messages for information indicative of the at least one component carrier and the associated resources and the trigger, the information and the trigger can be communicated from the first station to the second station in a single message.

More particularly, relevant SRS transmission parameters can have been configured such that the user equipment can be configured to transmit aperiodic channel state information (CSI) and aperiodic SRS via at least one secondary component carrier (SCC). The information may comprise information such as a set of cell specific and user equipment specific SRS subframes (periodicity, offset), SRS starting position, SRS bandwidth (user equipment and cell specific), SRS Comb, SRS hopping configuration, and SRS sequence. These parameters may be either component carrier specific or common for all component carriers.

The user equipment can then receive at 70 a uplink resource assignment (UL grant) via the PDCCH. After the receipt it is defined at 72 whether the grant is a normal PUSCH grant or "aperiodic CSI on PUSCH-only" grant. If the grant is not of the latter type, e.g. contains a PUSCH allocation, then transmission of data on physical uplink shared channel (PUSCH) can take place at 73. In accordance with a possibility the UL grant can be determined to be an "aperiodic CSI on PUSCH-only" grant if:

a. $I_{MCS}=29$,
b. the "CQI request" bit in DCI format 0 is set to 1, and
c. $N_{PRB} \leq 4$
Where I=the Index of a Modulation and Coding Scheme (MCS),
CQI=channel quality indicator
DCI=Downlink Control Information; and
N=number of physical resource blocks (PRBs)

In the case the user equipment determines that it has received PUSCH grant corresponding to aperiodic CSI only, it can next check at 74 aperiodic SRS-trigger bits/states to see whether to include aperiodic SRS or not in uplink transmission. If it is determined that no SRS is needed, the procedure can enter step 75.

If a need for aperiodic sounding reference signalling is determined at 74, the user equipment can check at 76 a predetermined signalling bit or signalling state to see whether to signal "SRS only" or "SRS in combination of aperiodic CSI". In the latter case, the process enters step 78. A new data indicator (NDI) bit can be used to indicate whether to use "SRS only" transmission at 76. For example, if the user equipment receives an uplink (UL) grant corresponding to CQI-only transmission, with aperiodic SRS trigger enabled and new data indicator NDI=1, it shall transmit at 77 aperiodic SRS on an uplink component carrier as indicated by the SRS signalling field.

It is noted that the resource assignment message can comprise a downlink grant signalled on an appropriate physical control channel.

In the case of SRS-only transmission at 77, a resource allocation field can be reinterpreted to be used as an indication of the uplink component carrier to be used for SRS transmission. In accordance with a possible alternative e.g. the Modulation and Coding Scheme (MCS) field may be used for this purpose.

In accordance with an embodiment the at least one component carrier is determined based on a linked component carrier. For example, a linkage between a resource allocation grant (e.g. Uplink grant) and uplink component carrier carrying aperiodic sounding reference signal can be made implicitly based on system information (SI). A downlink component carrier carrying the uplink resource allocation grant can be used to define the uplink component carrier for carrying the aperiodic SRS. A pre-defined cell-specific downlink carrier-uplink carrier linkage signalled by the network as a part of system information can be used for this purpose. This kind of linkage may be needed to be provided, for example, due to initial access on a random access channel (RACH).

An appropriately adapted computer program code product or products may be used for implementing the embodiments, when loaded or otherwise provided on an appropriate data processing apparatus, for example for causing determinations of appropriate configurations and communications of information between the various nodes. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The above described embodiments may provided various advantages. For example, cross-component carrier aperiodic sounding reference signal triggering may be provided, making it possible to request for an aperiodic sounding reference signal transmission on any uplink component carrier. A simple, implementation and standardization friendly way of providing support for aperiodic SRS with carrier aggregation may be provided. There may be no need to increase PDCCH payload.

It is noted that whilst embodiments have been described in relation to communications system such as those based on the LTE and 3GPP based systems, similar principles can be applied to any other communication system where reference signals are used. Instead of uplink reference signalling, this may occur in the downlink, or between substantially similar stations. Thus, instead of communications between base station and communication devices such as a user equipment the communications may be provided directly between two or more user equipment. For example, this may be the case in application where no fixed station equipment is provided but a communication system is provided by means of a plurality of user equipment, for example in adhoc networks. Also, the above principles can also be used in networks where relay nodes are employed for relaying transmissions between stations. Therefore, although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the spirit and scope of the present invention.

The invention claimed is:

1. A method comprising:
   determining resources for reference signalling on at least one component carrier of a plurality of aggregated component carriers;
   sending information indicative of the at least one component carrier and associated resources for configuration of a station for reference signalling;
   sending a trigger for reference signalling; and
   in response to the trigger, receiving at least one reference signal from the station on the indicated at least one component carrier, wherein the indicated at least one component carrier is determined by analyzing predefined bits of the information according to a pre-established protocol,
   wherein indication of the at least one component carrier and the trigger are communicated in the same message, and further comprising:
   determining that the message is only for assigning resources for signalling of aperiodic channel state information;
   checking the state of the trigger for reference signaling;
   determining, based on the message, that only reference signalling is to be transmitted; and
   determining at least one component carrier for reference signalling based on analysis of a predefined field of the message.

2. A method comprising:
   receiving at a station information indicative of at least one component carrier of aggregated component carriers and associated resources for use in reference signalling; and
   in response to a trigger, sending from the station at least one reference signal using the indicated at least one component carrier and resources, wherein the indicated at least one component carrier is determined by analyzing predefined bits of the information according to a pre-established protocol,
   wherein indication of the at least one component carrier and the trigger are communicated in the same message, and further comprising:
   determining that the message is only for assigning resources for signalling of aperiodic channel state information;
   checking the state of the trigger for reference signaling;
   determining, based on the message, that only reference signalling is to be transmitted; and
   determining at least one component carrier for reference signalling based on analysis of a predefined field of the message.

3. The method as claimed in claim 2, wherein the reference signal comprises an aperiodic sounding reference signal.

4. The method as claimed in claim 2, wherein the information of resources associated with a component carrier comprises an indication of at least one time instance on which reference signalling can be sent on the given component carrier.

5. The method as claimed in claim 2, wherein the associated resources comprise transmission parameters for the at least one component carrier, the transmission parameters defining at least one of a set of cell specific and/or user equipment specific reference signal subframes, reference signal starting position, reference signal bandwidth, reference signal comb, reference signal hopping configuration, and reference signal sequence.

6. The method as claimed in claim 2, comprising providing the station with a time pattern indicative of possible subframes for sending of reference signalling.

7. The method as claimed in claim 2, comprising receiving or sending a reference signal in the first available subframe following a subframe carrying the trigger.

8. The method as claimed in claim 2, comprising analysing the information and the trigger by a user equipment to determine component carrier, timing and other resources for the triggered reference signalling.

9. The method as claimed in claim 2, wherein said information and the trigger are communicated in separate messages.

10. The method as claimed in claim 2, wherein indication of the at least one component carrier to be used is carried by a resource assignment message.

11. The method as claimed in claim 10, wherein the resource assignment message comprises an uplink grant or a downlink grant signalled on a physical control channel.

12. The method as claimed in claim 2, comprising determining at least one component carrier for use in reference signalling based on analysis of predefined bits of the message.

13. The method as claimed in claim 2, comprising signalling the information on a signalling layer that is higher than the layer used for signalling of the at least one reference signal.

14. The method as claimed in claim 2, comprising using a single component carrier for reference signalling at a time.

15. The method as claimed in claim 2, comprising using at least two component carriers for reference signalling at a time.

16. The method as claimed in claim 2, comprising prioritizing component carriers.

17. The method as claimed in claim 2, comprising determining the at least one component carrier based on a linked component carrier.

18. The method as claimed in claim 17, wherein linkage between a resource allocation grant and an uplink component carrier carrying aperiodic sounding reference signal is made based on system information.

19. An apparatus comprising:
    at least one processor; and
    at least one memory including computer program code, the at least one memory and the computer program code being configured, with the at least one processor, to:
    determine resources for reference signalling on at least one component carrier of a plurality of aggregated component carriers;
    send information to a second station indicative of the at least one component carrier of a plurality of aggregated component carriers and associated resources to be used for reference signalling by the second station;
    send a trigger for reference signalling; and
    in response to the trigger, receive at least one reference signal from the station on the indicated at least one component carrier, wherein the indicated at least one component carrier is determined by analyzing predefined bits of the information according to a pre-established protocol,
    wherein indication of the at least one component carrier and the trigger are communicated in the same message, and further comprising:
    determining that the message is only for assigning resources for signalling of aperiodic channel state information;

checking the state of the trigger for reference signaling;

determining, based on the message, that only reference signalling is to be transmitted; and determining at least one component carrier for reference signalling based on analysis of a predefined field of the message.

20. A base station apparatus comprising the apparatus in accordance with claim 19.

21. A computer program product comprising a non-transitory computer-readable storage medium bearing computer program code embodied therein for use with a computer, the computer program code comprising code for performing the method according to claim 2.

22. An apparatus comprising:

at least one processor; and at least one memory including computer program code, the at least one memory and the computer program code being configured, with the at least one processor, to:

determine, from signalling received from a first station, information indicative of at least one component carrier of aggregated component carriers and associated resources for use in reference signalling by a second station; and in response to a trigger, send from the second station at least one reference signal using the indicated at least one component carrier and resources, wherein the indicated at least one component carrier is determined by analyzing predefined bits of the information according to a pre-established protocol, wherein indication of the at least one component carrier and the trigger are communicated in the same message, and further comprising:

determining that the message is only for assigning resources for signalling of aperiodic channel state information;

checking the state of the trigger for reference signaling;

determining, based on the message, that only reference signalling is to be transmitted; and determining at least one component carrier for reference signalling based on analysis of a predefined field of the message.

23. The apparatus as claimed in claim 22, wherein the reference signal comprises an aperiodic sounding reference signal.

24. The apparatus as claimed in claim 22, wherein the information of resources associated with a component carrier comprise an indication of at least one time instance on which reference signalling can be sent on the given component carrier.

25. The apparatus as claimed in claim 22, configured to provide the second station with resource information comprising at least one of a set of cell specific and/or user equipment specific reference signal subframes, reference signal starting position, reference signal bandwidth, reference signal comb, reference signal hopping configuration, and reference signal sequence.

26. The apparatus as claimed in claim 22, configured to provide the second station with a time pattern indicative of possible subframes for sending of reference signalling.

27. The apparatus as claimed in claim 22, configured to cause sending of a reference signal in the first available subframe in response to the trigger.

28. The apparatus as claimed in claim 22, configured to communicate indication of the at least one component carrier and the trigger in a single message.

29. The apparatus as claimed in claim 28, configured to determine at least one component carrier for use in reference signalling based on analysis of predefined parts of the message.

30. The apparatus as claimed in claim 28, configured to determine that the message is only for assigning resources for signalling of aperiodic channel state information, to check the state of the trigger for reference signaling, and to determine that only reference signalling is to be transmitted.

31. The apparatus as claimed in claim 22, configured to communicate indication of the at least one component carrier for reference signalling by means of a resource assignment message.

32. A communication device comprising the apparatus in accordance with claim 22.

33. The communication device as claimed in claim 32, comprising a mobile user equipment.

34. A communication system comprising the apparatus, a communication device and/or base station in accordance with claim 22.

* * * * *